July 9, 1940.  C. A. LUNDEEN  2,207,203

SUPPORT FOR UPSET PIPE OR ROD

Filed May 14, 1938  2 Sheets-Sheet 1

Inventor
Chester A. Lundeen
By Lyon & Lyon
Attorneys

July 9, 1940.   C. A. LUNDEEN   2,207,203
SUPPORT FOR UPSET PIPE OR ROD
Filed May 14, 1938   2 Sheets-Sheet 2

Inventor
Chester A. Lundeen
By Lyon & Lyon
Attorneys

Patented July 9, 1940

2,207,203

UNITED STATES PATENT OFFICE 2,207,203

SUPPORT FOR UPSET PIPE OR ROD

Chester A. Lundeen, Los Angeles, Calif., assignor to Byron Jackson Co., Huntington Park, Calif., a corporation of Delaware Application May 14, 1938, Serial No. 208,036

4 Claims. (Cl. 24—263)

This invention relates generally to supports for well pipe or rods, and is directed particularly to a pipe support designed to handle single joints of well casing having only a slight external upset at a small angle of inclination to the pipe axis.

External upsets on well casing are usually formed with a tapered portion merging into the pipe proper, and pipe supports designed to handle external upset pipe are usually provided with a downwardly and inwardly tapered seat conforming to the taper of the upset on the pipe. When in use the load exerts a wedging action between the pipe and the seat in the support. It is the present practice to manufacture this upset pipe so that the taper is very slight, and may be at as small an angle as 10°. But experience has taught that if the inclination of this wedge surface is less than 10°, the lateral component of the thrust is so great as to cause the parts to become firmly jammed, or "frozen" together on the contacting wedging surfaces, requiring the exertion of considerable force to pull them apart.

A principal object of this invention is to overcome this difficulty; also to provide a pipe support for handling external upset pipe having such an upset taper, and having means for releasing the pressure between the wedged members in the event they become stuck, or jammed together as suggested.

Further objects of the invention will appear hereinafter.

The invention consists in the novel parts and combination of parts to be described hereinafter, all of which contribute to produce an efficient support for upset pipe or rods.

A preferred embodiment of the invention is described in the following specification, while the broad scope of the invention is pointed out in the appended claims.

Before proceeding to a more detailed description of the invention, it should be stated that in practicing the invention I provide a pipe support capable of supporting tapered external upset pipe. This support has a bore through it to receive the pipe, and also supports pipe-engaging members having inner faces cooperating to form a downwardly and inwardly tapered seat conforming substantially to the tapered upset on the pipe. These members are mounted for movement away from the pipe, the said movement operating to enable the elevator to free itself from the pipe by a relative downward movement on the pipe. When at rest the engaging members are supported positively on an abutment or shoulder.

Figure 1:
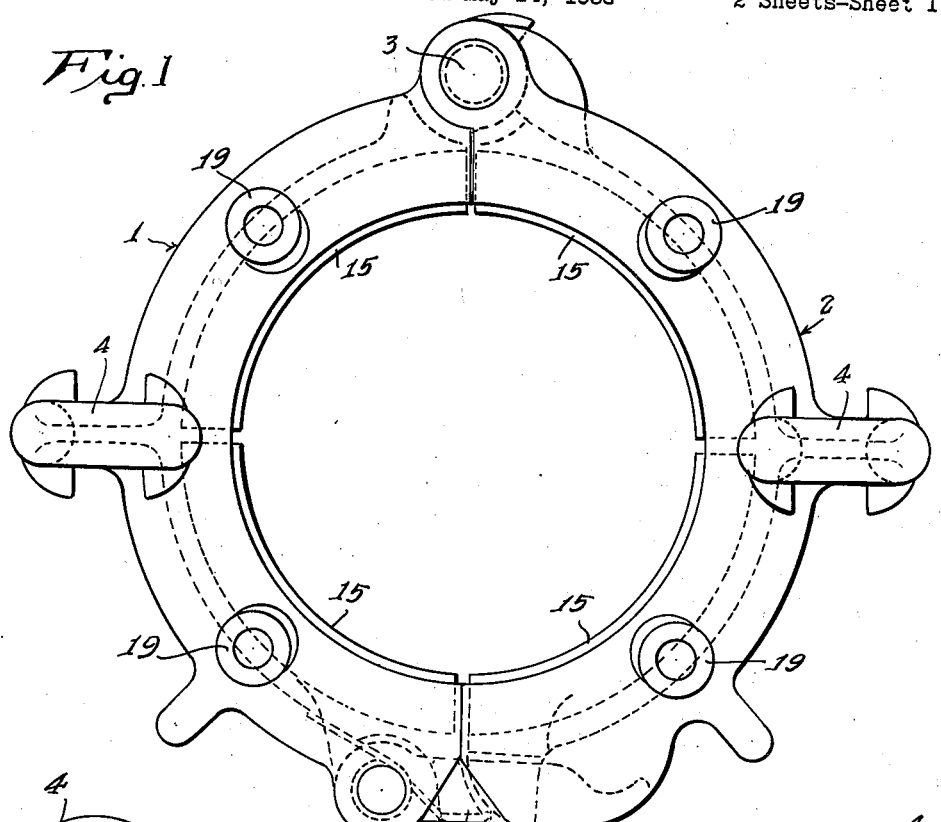
Fig. 1 is a top plan view of an elevator embodying this invention.
Figure 2:
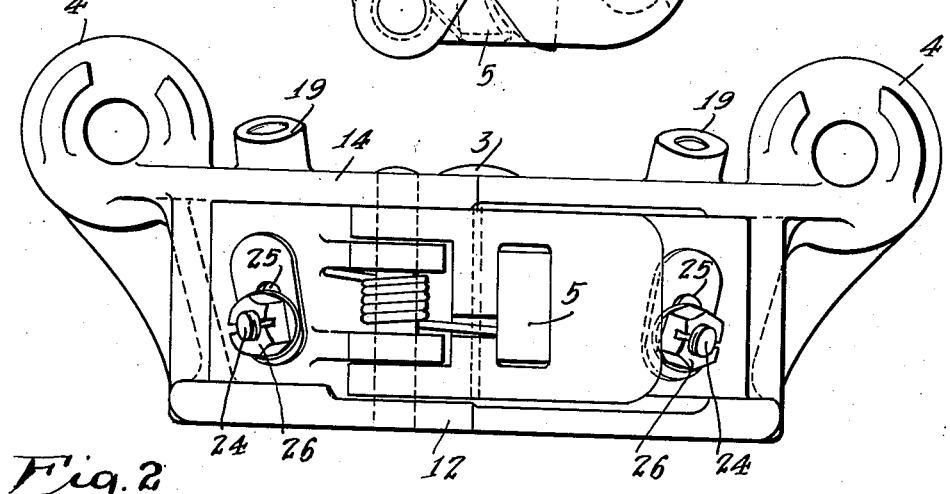
Fig. 2 is a front elevation of the elevator shown in Fig. 1.

The novel features of my improved support are shown as incorporated in an elevator of the center latch type (see Figs. 1 and 2), consisting of a body comprising two semi-circular pipe-engaging members or sections 1 and 2, pivotally connected at the rear, preferably by a hinge pin 3. Each section is provided with an ear 4 adapted to receive the lower end of an elevator link of any common construction (not shown). Latch means 5 of any suitable construction is provided on the free ends of the sections, to lock the latter in closed relation about a section of casing. None of the foregoing features form a part of the present invention.

A downwardly tapered conical seat or seating surface 10 (Fig. 3) inclined from the vertical plane is formed on the inner periphery of the sections 1 and 2, terminating at its lower end in a rest that positively supports the engaging members and is preferably in the form of a narrow horizontal abutment or shoulder 11 on the lower flange 12. This shoulder forms a rest for supporting the slips normally in their working position. In the present instance, the surface 10 is inclined at an angle of approximately 15° from the axis of the supported pipe 13. Housed within the recess defined by the top flange 14, the surface 10, and the lower shoulder 11, are pipe-engaging members, preferably in the form of slips 15. In the present instance, there are four slips illustrated, two in each elevator section; but in practice if desired, a greater or less number may be employed.

Figure 3:
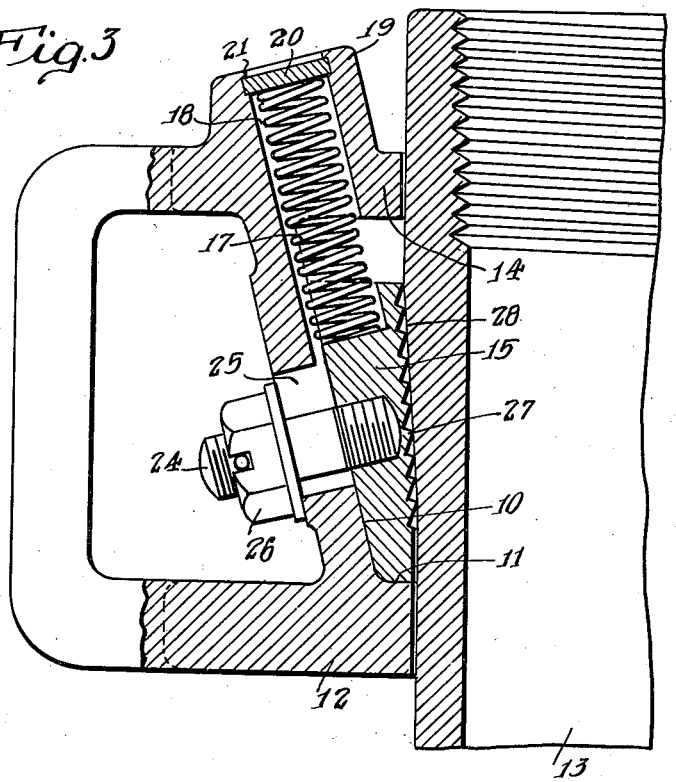
Fig. 3 is a vertical section taken on the line 3—3 of Fig. 1, upon an enlarged scale.
Figure 4:
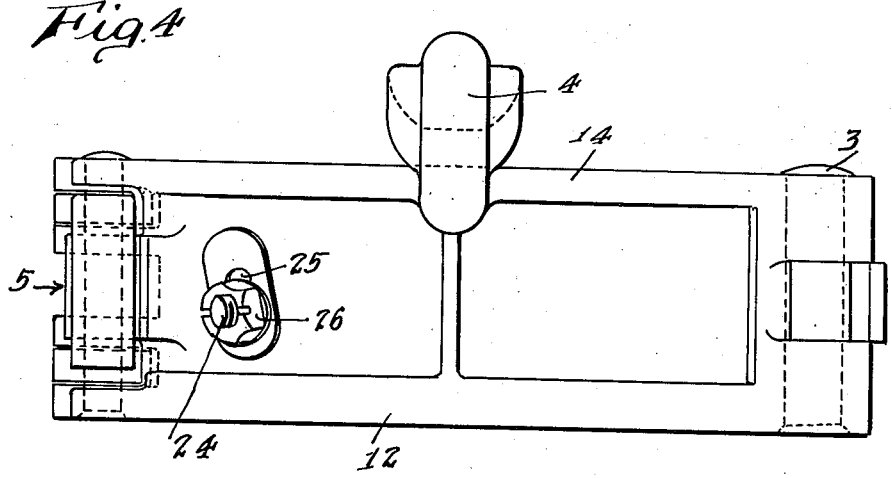
Fig. 4 is a side elevation of the elevator.

The slips are mounted for limited vertical sliding movement along the surface 10, being preferably urged downwardly against the shoulder 11 by springs 17 disposed in spring chambers or bores 18 formed in the upper flange 14 and partly in lugs or bosses 19 projecting upwardly from the flange. The upper end of each spring bears against a disc 20 retained in the bore 18 preferably by peening over the upper edge of the bore, as at 21 (Fig. 3). When the elevator is not in use, the slips are retained in sliding contact with the conical surface 10 by bolts 24 threadedly connected to the slips and projecting through vertically elongated slots 25 in the body of the elevator, and engaged by nuts 26.

The inner pipe-engaging surfaces of the slips are preferably formed with means for gripping the pipe, and for this purpose they are preferably serrated so as to form transverse teeth or wickers 27, and are frustro-conical, tapering downwardly at the pipe at a slighter angle than the surface 10. In the present case the inner slip surfaces, that is to say, the elemental lines for the same, are inclined at an angle of approximately 5° to the central axis, to conform to a 5° taper on the bell 28 of the female joint of the section of casing 13. It will be understood, of course, that the taper or inclination of these surfaces of the slips should correspond to the taper of the upset on the casing.

From the foregoing description, the mode of operation of the device will be apparent. The springs 17 normally retain the slips in their extreme lower positions, seated on shoulders 11. When the sections 1 and 2 are closed about a pipe, the flanges 12 and 14 and slips 15 clear the straight portion thereof, and the bore of the upper flange is slightly larger than the upset female end of the pipe. As the elevator is raised along the pipe to the upper end thereof, the slips engage the bell 28 with a wedging action. However, since the slips are seated on the shoulder 11 the wedging action is transferred to a vertical load on the flange 12. The provision of the teeth 27 on the slips also aids in transforming the lateral wedging action to a vertical thrust. As the teeth engage the upset they gradually bite into the surface, forming downwardly facing shoulders thereon which rest on the upper faces of the teeth, exerting a downward thrust on the slips.

A wedging action at a small wedge angle of the order of 5° is capable of causing the slips to "freeze" to the pipe, interfering with the ready release of the elevator. This condition is taken care of by the provision of limited sliding movement of the slips in the elevator. If the slips should become jammed or stuck to the pipe, downward movement of the elevator relative to the pipe will cause the slips to move relatively upwardly and outwardly along the inclined surface 10, releasing the lateral pressure and allowing the slips to break away from the pipe. The inclination of the surface 10 is such that there is no danger of "freezing" between the slips and the elevator body. This possibility is further reduced by the fact that no sliding wedging action occurs along the surface 10, the slips being in their lowermost position and resting on the shoulder 11 so that this shoulder takes substantially all of the load or thrust of the load that is exerted in a substantially vertical plane.

It is obvious that this pipe support is equally well adapted for supporting upset rods.

It is understood that the embodiment of the invention described herein is only one of the many embodiments this invention may take, and I do not wish to be limited in the practice of the invention, nor in the claims, to the particular embodiment set forth.

What I claim is:

1. In a releasable support for tapered external upset pipe or rods, the combination of a body having a bore therethrough to receive the pipe, pipe-engaging members mounted on said body for upward movement away from the axis of said bore, and having inner faces inclined from a vertical plane, cooperating to form a downwardly and inwardly tapered seat conforming substantially to the tapered upset on the pipe, and means on said body presenting a shoulder engaged by said members for taking the thrust of the load in a substantially vertical plane, and for normally supporting the pipe-engaging members, said parts cooperating so that when the support is lowered relatively to the pipe, the engaging members may move upward relatively to the body and release the pipe.

2. In a releasable support for tapered external upset pipe or rods, the combination of a body having a bore therethrough to receive the pipe, pipe-engaging members, inclined guideways for the outer sides of said engaging members formed on said body inclined to the vertical, said engaging members having inner faces inclined from a vertical plane cooperating to form a downwardly and inwardly tapered seat conforming substantially to the tapered upset on the pipe, said body having a shoulder on which the lower ends of said engaging members rest, for taking the thrust of the load in a substantially vertical plane and relieving the first-named inclined faces from a substantial amount of outward pressure due to the load, said parts cooperating so that when the support is lowered relative to the pipe, the engaging members may move upward relatively to the body and release the pipe.

3. In a releasable support for tapered external upset pipe or rods, the combination of a body having a bore therethrough to receive the pipe, pipe-engaging members, inclined guideways for the outer sides of said engaging members formed on said body inclined to the vertical, said engaging members having inner faces inclined from a vertical plane cooperating to form a downwardly and inwardly tapered seat conforming substantially to the tapered upset on the pipe, said body having a shoulder on which the lower ends of said engaging members rest, for taking the thrust of the load in a substantially vertical plane and relieving the first-named inclined faces from a substantial amount of outward pressure due to the load, said parts cooperating so that when the support is lowered relative to the pipe, the engaging members may move upward relatively to the body and release the pipe; and resilient means for pressing the engaging members against said shoulder.

4. In a releasable support for tapered external upset pipe or rods, the combination of a body having a bore therethrough to receive the pipe, pipe-engaging members, inclined guideways for the outer sides of said engaging members formed on said body inclined to the vertical, said engaging members having inner faces inclined from a vertical plane cooperating to form a downwardly and inwardly tapered seat conforming substantially to the tapered upset on the pipe, said body having a shoulder on which the lower ends of said engaging members rest, for taking the thrust of the load in a substantially vertical plane and relieving the first-named inclined faces from a substantial amount of outward pressure due to the load, said parts cooperating so that when the support is lowered relative to the pipe, the engaging members may move upward relatively to the body and release the pipe, and cooperating means on the body and the pipe-engaging members for maintaining the latter in engagement with the said inclined guideways.

CHESTER A. LUNDEEN.